United States Patent [19]

Panzer et al.

[11] 4,053,512

[45] Oct. 11, 1977

[54] PROCESS FOR PREPARING POLY(ALLYLTRIALKYLAMMONIUM) SALT FLOCCULANTS

[75] Inventors: Hans Peter Panzer; Dinshaw Framroze Bardoliwalla, both of Fairfield County, Conn.

[73] Assignee: American Cyanamid Company, Stamford, Conn.

[21] Appl. No.: 710,530

[22] Filed: Aug. 2, 1976

[51] Int. Cl.$^2$ ............................................. C07C 85/00
[52] U.S. Cl. .............................. 260/567.6 P; 210/54; 260/501.15; 260/561 N; 260/583 P; 260/583 L
[58] Field of Search ................... 260/567.6 P, 501.15; 526/303, 42, 23, 46; 210/54 C

[56] References Cited

U.S. PATENT DOCUMENTS

| | | | |
|---|---|---|---|
| 2,831,841 | 4/1958 | Jones | 210/54 C |
| 2,915,481 | 12/1959 | Ayers et al. | 526/23 |
| 3,247,171 | 4/1966 | Walker et al. | 526/303 |
| 3,507,847 | 4/1970 | Williams et al. | 210/54 C |
| 3,897,404 | 7/1975 | Korte et al. | 526/49 |

*Primary Examiner*—James O. Thomas, Jr.
*Assistant Examiner*—James H. Reamer
*Attorney, Agent, or Firm*—William J. van Loo

[57] ABSTRACT

High molecular weight poly(allyltrialkylammonium) salt flocculants are obtained by preparing a preliminary poly(N,N-dialkylacrylamide), reducing the preliminary polymer to form an intermediate poly(allyldialkylamine), and quaternizing the intermediate polymer to form the final polyquaternary salt.

10 Claims, No Drawings

PROCESS FOR PREPARING POLY(ALLYLTRIALKYLAMMONIUM) SALT FLOCCULANTS

CROSS-REFERENCE TO RELATED APPLICATIONS

This application is related to applications Ser. Nos. 710,527, 710,528, and 710,529, all of which were filed on even date herewith.

This invention relates to a process for the preparation of high-efficiency polyquaternary flocculants of high molecular weight. More particularly, this invention relates to such a process wherein the desired polyquaternary polymer arises from modification of a polyacrylamide.

Flocculation of aqueous dispersions is an important operation. Throughout this application the term "aqueous dispersion" will be used in its broad sense of any system having at least two phases, one of which is a continuous outer aqueous phase regardless of whether the disperse phase or phases are suspensions of fine particles or much larger particles. In other words, the term will be used to cover systems from river water having small amounts of suspended solids on through industrial and municipal wastes, such as sewage, sewage sludge to be dewatered, and industrial product dispersions such as mashes from the fermentation processes for producing such materials as enzymes, etc.; iron ore tailings; raw water; alum sludge; coal washings; titanium dioxide digestion liquors; and the like. The aqueous dispersions with which the present invention deals have disperse material which has a negative charge; and in the case of clarification of river water, for example for producing drinking water or industrial water, there is often chlorine present, which creates further problems.

In order to flocculate aqueous dispersions where the disperse phase has negative charges, it has been customary to use materials such as alum, ferric salts, and the like which are transformed into the hydroxides or to use organic cationic flocculants, which neutralize the negative charge. Particularly with dispersions which have been chlorinated, flocculants of the present invention which are polyquaternary flocculants, are important as they are not only useful with negatively charged particles but also do not react with chlorine under conditions of use and become degraded, as is the case with certain other cationic flocculants.

Cationic flocculants are extensively used and in some instances, polyquaternary flocculants are used. However, as comparatively large dosages of flocculants are often needed and as polyquaternary compounds can be fairly expensive, the cost of treatment is a serious economic factor, and there is a great deal of room for improvement which would permit using smaller amounts and/or cheaper products.

The physical properties that are responsible for effective performance of various flocculants are not precisely known and, therefore, are not predictable. There is no good correlation between property modifications that result in more effective performance with one flocculant type and those property modifications that result in more effective performance with another flocculant type. Although some physical properties are shared by certain effective flocculants, the effect of variation of individual properties thereof does not appear to have been investigated to any great extent nor do the results of limited investigations lead to any consistant conclusions.

Polyacrylamide, which is not ionic, can be modified to form ionic polymers. One method is to partially hydrolyze the amide groups to acid groups but such polymers are anionic and not useful for dispersed particles of negative charge. Another method of modifying polyacrylamide is to provide Mannich base moieties therein by suitable reaction with formaldehyde and a secondary amine. Although such polymers are cationic, they are extremely sensitive to chlorine and cannot be used effectively in chlorinated waters.

Many cationic flocculants are polymeric reaction products of epichlorohydrin and amines. Depending upon the nature of the amine employed, the resulting polymer will have a variety of properties. Using ammonia or a polyamine terminating in primary amine groups, the polymer backbone chain will contain secondary amine groups, which can undergo further reaction with epichlorohydrin, leading to chain-branching and crosslinking without the necessary production of quaternary ammonium groups. Such polymers are not free of susceptibility to chlorine reaction and do not possess the strong cationicity afforded by quaternary groups. Also, because of the excessive chain-branching and crosslinking possible, such reactions can generally only be conducted to a limited extent without gelation occurring, which leads to a water-insoluble polymer. In most cases, the polymer obtained at incipient gelation is only moderately effective as a flocculant.

If epichlorohydrin is reacted with a primary amine such as methyl amine, the backbone chain of the polymer will contain tertiary amine groups. However, epichlorohydrin can react with a tertiary amine group to produce a quaternary ammonium group and lead to chain-branching and crosslinking. Even under controlled conditions of reaction and reactant addition, there is a limit to the extent of reaction that can be effected without causing gelation. Generally at the point of incipient gelation, the reaction product has only limited quaternary groups and is only moderate in effectiveness as a flocculant. Although the product can be improved to some extent by subsequent reaction with a quaternizing reagent, the additional processing steps and costs are generally not offset by the improved effectiveness achieved.

If epichlorohydrin is reacted with a secondary amine such as dimethylamine, the backbone chain of the polymer will contain quaternary ammonium groups in the linear chain. The reaction product is obtainable in rather limited molecular weight due to the difficulty of adding units to a lengthy polymer chain instead of forming a new polymer chain. Thus, although the polymer obtained has a linear chain and high quaternary ammonium group content, the polymer is less than ideal because of its low molecular weight and the steric arrangement of its quaternary groups, immobile in the backbone polymer chain. A modification of this polymer type can be obtained by substituting for a minor portion of the secondary amine, a polyamine such as diethylenetriamine. The resulting polymer, while of higher molecular weight, has chain branches, crosslinks, loss of quaternary group density, and some susceptibility to reaction with chlorine.

Another type of quaternary flocculant that can be obtained arises from the polymerizing diallyldimethylammonium chloride. This monomer produces a polymer of high molecular weight in which the two allyl groups produce a ring structure while providing a backbone polymer chain. Such a polymer is less than ideal because of the steric arrangement of its quaternary groups, immobilized in a ring structure that forms part of the backbone chain.

In U.S. Pat. No. 2,884,057, there are suggested several methods by which polyquaternary compounds useful as paper strengthening agents can be obtained. One method involves the quaternization of a polymer derived from N-methylethylenimine. Another method involves copolymerization of a quaternary ammonium monomer with a non-quaternary monomer copolymerizable therewith. Still another method relates to reaction of certain polymers with other materials that provide modified polymers. However, the reference does not deal with polyquaternaries that are based on quaternized allylamine.

Thus, there continues to exist the need for a process whereby polyquaternary flocculants can be prepared in high molecular weight, having high quaternary group density, an extensive linear chain, and quaternary groups that are mobile and pendant from the backbone polymer chain. Such a provision could lead to an ideal flocculant that provides advantages in performance at reduced dosage requirements.

In accordance with the present invention, there is provided a process for preparing a polyquaternary flocculant which process comprises: (1) preparing a preliminary free-radical polymer of a dialkyl acrylamide of the structure

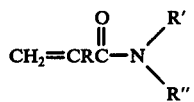

wherein R is hydrogen or methyl and R' and R" are alkyl groups such that the total number of carbons provided by R' and R" is from 2 to about 4, said polymer having a molecular weight of at least about 5,000; (2) reducing the amide groups of the preliminary polymer so as to provide the corresponding intermediate allyldialkylamine polymer; and (3) quaternizing the intermediate polymer to provide the corresponding final poly(allyltrialkylammonium) flocculant in the form of a watersoluble salt, said polymer containing a total of 3 to about 5 carbon atoms in said trialkyl groups.

In preferred embodiments, the polyquaternary flocculants have molecular weights of at least about 50,000, more preferably, of at least about 250,000. Also in preferred embodiments, the acrylamide polymer is N,N-dimethylacrylamide and the quaternization is effected with dimethyl sulfate.

The process provides preferred polyquaternary compounds that possess a completely linear backbone polymer chain that contains mobile pendant relatively small quaternary ammonium groups on each alternate carbon atom of the backbone chain. Such structure provides a high charge density in pendant mobile quaternary groups of small size that leads to improved performance in flocculating operations. For a specific molecular weight of polymer, polyquaternaries of the present invention provide lower dosage requirements for a given performance in flocculation than do prior art flocculants. At the same time, the polyquaternaries of the present invention are completely resistant to chlorine attack when used in flocculating chlorinated waters as compared to other flocculants which can become severely degraded by the action of chlorinated water.

The polyquaternary compounds prepared by the process of the present invention cannot be prepared directly from a quaternized allylamine or methallylamine because such monomers do not polymerize to a sufficient extent to provide the molecular weight polymers necessary. As a result, the polymers must be prepared by indirect methods, wherein an alternative monomer is formed into a polymer of suitable molecular weight and is then converted into the desired poly(quaternized allylamine).

Suitable N,N-dialkylacrylamide for preparing the preliminary polymer include N,N-dimethylacrylamide, N,N-dimethylmethacrylamide, N-methyl, N-ethylacrylamide, N-methyl, N-ethylmethacrylamide, N,N-diethylacrylamide, N,N-diethylmethacrylamide, N-methyl, N-isopropylacrylamide, N-methyl, N-isopropylmethacrylamide, N-methyl, N-n-propylacrylamide, and N-methyl, N-n-propylmethacrylamide. Such monomers, singly or in admixture, are polymerized by conventional freeradical procedures using appropriate initiators to provide a preliminary polymer of appropriate molecular weight. Such monomers in conjunction with suitable conventional variations in the free-radical polymerization offer a wide range of molecuar weights in the preliminary polymer, i.e. from about 5,000 to about 260,000 or higher. Thus, depending upon the performance characteristics desired in the polyquaternary flocculant, the molecular weight of the preliminary polymer is provided accordingly. It is, of course, to be realized that the final polymer will have a somewhat higher molecular weight than the preliminary polymer because the introduction of the quaternary ammonium groups increase the molecular weight of the repeating polymer units. Typically, preliminary polymers having molecular weights of about 5,000, 50,000, and 250,000 are prepared for different flocculation processes.

After the desired preliminary poly(N,N-dialkylacrylamide) is obtained, it is subjected to reduction to provide the corresponding poly(N,N-dialkylallylamine). Such reduction is carried out in accordance with conventional procedures. A preferred procedure is that described in *Journal of Polymer Science*, Polymer Chemistry Edition, Volume 13 (1975) pages 745–748. In the reference process, sodium bis(2-methoxyethoxy) aluminum hydride is used as the reducing agent in N-methylmorpholine medium, the reduction is carried out overnight on a steam bath, and a solid polymer is recovered which shows complete absence of carbonyl absorption in the infrared, thus indicating complete reduction to the amine counterpart. Alternative reduction procedures that produce substantially equivalent results may also be used. The polymer resulting from such reduction is a poly(N,N-dialkylallylamine) intermediate.

After the poly(N,N-dialkylallylamine) is obtained as described, it is next subjected to reaction with a suitable quaternization agent under conventional reaction conditions to provide the desired poly(N,N,N-trialkylallylammonium) salt flocculant. The quaternization agent should be selected on the basis of the number of carbon atoms already present on the poly(N,N-dialkylallylamine) so that the number of carbon atoms to be added upon quaternization will not exceed the total prescribed. Thus, the poly(N,N-dialkylallylamine) to be quaternized will contain from 2 to 4 carbon atoms, depending upon the choice of N,N-dialkylacrylamide used to prepare the preliminary polymer. The quaternization agent, therefore, may add an alkyl group, correspondingly, of carbon content 3 to 1 so that the number of carbons in the alkyl groups of the quaternized nitrogen does not exceed about five. Preferably, such quaternization is carried out in an alcohol-water medium using dimethyl sulfate as the quaternization agent in stoichiometric excess to ensure complete quaternization and reaction is effected over 6-8 hours at 40°-50° C., after which the polyquaternary in the form of the methosulfate salt is recovered in pure, solid from following conventional procedures. The salt form may be altered as desired by suitable ion exchange.

As indicated, the poly(trialkylallylammonium) salts of the present invention may be provided in a wide range of molecular weights, from at least about 5,000, preferably, at least about 50,000 or 250,000. These cationic polymer salts are effective flocculants in a wide variety of applications where their immunity to chlorine degradation is a significant advantage. Depending upon the particular flocculation operation to be conducted, most efficient performance is generally obtained by the use of polymeric flocculants having a specific range of molecular weights. The present flocculants in the most efficient molecular weight range for the specific flocculation operation generally provide equal effectiveness at lower dosage requirements in addition to their immunity to chlorine degradation.

The invention is more particularly illustrated by the examples which follow wherein all parts and percentages are by weight unless otherwise specified.

EXAMPLE 1

A. Homopolymerization of N,N-Dimethylacrylamide

Into a suitable reactor were charged 33 grams N, N-dimethylacrylamide, 100 grams 1,4-dixoane, and 0.33 grams of azobis(isobutyronitrile). The reactor was purged with nitrogen and heated to 40°-45° C. The exotherm caused the reaction temperature to rise to about 110° C. in about 25 minutes. After the exotherm subsided and the temperature dropped to 65° C. (about 30 minutes), the reaction was maintained at 65° C. for an additional two hours. The reactor was then cooled to room temperature and the contents removed. The polymer solution was treated with an excess of anhydrous ether to precipitate the polymer, which was isolated. The precipitate was redissolved in methanol and again isolated by precipitation with anhydrous ether. The polymer was then dried overnight at 50° C. in a vacuum desicator. A hygroscopic solid was obtained.

B. Reduction of Poly(N,N-Dimethylacrylamide)

Carefully dried apparatus and materials were used. To the reactor were added 80 ml. of a 70% solution in benzene of sodium bis(2-methoxyethoxy) aluminum hydride and 200 ml. of N-methylmorpholine. The resulting solution, after purging nitrogen, was heated to 60°-65° C. and maintained at that temperature. In 100 ml. of N-methylmorpholine were dissolved 10 grams of the poly(N,N-dimethylacrylamide) prepared in A above. The resulting solution was purged with nitrogen and added to the reactor over a period of 4 hours while maintaining the reactor at 60°-65° C. After all the polymer solution was added, the reactor was maintained at 60°-65° C. for 16 hours. The reactor was then cooled to room temperature and 20 ml. of 50% aqueous NaOH was added slowly to the reactor to maintain the temperature below 30° C. and destroy excess reducing agent. There were then added 15 ml. of deionized water. A two-phase reaction mixture resulted. The clear supernatant liquid containing the polymer was decanted and collected while the gelations residue was discarded.

Using a rotary evaporator, the liquid collected was stripped of water to obtain a white solid polymer product. The polymer was dissolved in the minimum amount of absolute ethanol to effect solution and reprecipitated in 10% aqueous $Na_2CO_3$ solution. The precipitated polymer was soft and white and blotted free of excess water. The polymer was then dried in a vacuum desiccator at 40°-45° C. for 16 hours. The product was poly(-dimethylallylamine).

C. Quaternization of Poly(N,N-Dimethylallylamine)

To a suitable reactor were charged 6.5 grams poly (N,N-dimethylallylamine) obtained in B above and 60 ml. methanol/water mixture (12 ml. MeOH/48 ml. $H_2O$) and solution effected. At room temperature and under constant agitation 9.6 ml. of dimethyl sulfate (ratio polymers/DMS of 1/1.4) were added dropwise. After the dimethyl sulfate addition was complete, the reaction mixture was heated to 45° C. and maintained at such temperature for 7 hours. The reaction mixture was then cooled to room temperature and adjusted to pH 6-6.5 with 50% aqueous NaOH.

The reaction mixture was then dialyzed against deionized water for 24 hours. The dialyzed polymer solution was freeze dried to obtain poly(N,N,N-trimethylallylammonium) methylsulfate in solid form. The polymer was then dried in a vacuum desiccator at 50° C. over $P_2O_5$ for 16 hours. The resulting polymer had a molecular weight of 260,000.

EXAMPLE 2

Following the basic procedure of part A of Example 1, another polymer of N,N-dimethylacrylamide was prepared with the following exceptions. The charge to the reactor was as follows:

21.5 grams of N,N-dimethylacrylamide
193.5 grams of 1,4-dioxane
0.43 grams of azobis(isobutyronitrile)

The reaction was controlled at a temperature of 70° C. for 9 hours. Polymer recovery was as in Part A of Example 1.

The poly(N,N-dimethylacrylamide) thus prepared was then reduced and quaternized as in Parts B and C of Example 1. The poly(N,N,N-trimethylallylammonium) methosulfate obtained had a molecular weight of 52,000.

EXAMPLE 3

Again following the basic procedure of Part A of Example 1, another polymer of N,N-dimethylacrylamide was prepared with the following exceptions. The charge to the reactor was as follows:

9 grams N,N-dimethylacrylamide
91 grams isopropanol
0.045 grams azobis(isobutyronitrile)

The reaction was controlled at 55° C. for 16 hours. Polymer recovery was as in Part A of Example 1.

The poly(N,N-dimethylacrylamide) thus prepared was then reduced and quaternized as in parts B and C of Example 1. The poly(N,N,N-trimethylallylammonium) methosulfate obtained had a molecular weight of 5,300.

EXAMPLE 4

Evaluation of the polymer of Example 1, after ionexchange to provide the chloride salt, was carried out in the clarification of two simulated raw waters and raw water obtained from Lake Houston.

A stock suspension of clay is made by mixing 25 grams of kaolin in a liter of deionized water for 24 hours and then allowing settling in a graduated cylinder for 24 hours. The upper portion is decanted, such that the particle size of this fraction is not substantially in excess of 2μ. This concentration is then diluted with water to yield a test water containing 70 p.p.m. of kaolin.

A bentonite solution is prepared in a similar manner.

The polymer was evaluated at various dosage levels and the dosage required for an 80% reduction in turbidity was determined.

For comparison purposes, three commercial flocculants were also evaluated. Comparative Flocculant A is a high molecular weight polyquaternary obtained by reacting one mole of epichlorohydrin with one mole of dimethylamine. Comparative Flocculant B is a high molecular weight polyquaternary obtained by free radical homopolymerization of diallyldimethylammonium chloride. Comparative Flocculant C is a high molecular weight polyquaternary obtained by polymerizing epichlorohydrin, reacting the polyether thus obtained with dimethylamine, and quaternizing the reaction product thus obtained, as is shown in U.S. Pat. No. 3,428,680.

Results of these tests are given in Table I.

Table I

| Polymer Used | Dosage Requirements* Of Various Flocculants | | |
|---|---|---|---|
| | Kaolin Suspension | Bentonite Suspension | Lake Houston |
| Example 2 | 0.28 | 1.785 | 0.24 |
| Comp. Flocculant A | 0.465 | 3.0 | 0.61 |
| Comp. Flocculant B | 0.30 | 1.99 | 0.315 |
| Comp. Flocculant C | — | — | 0.45 |

*Parts per million for 80% reduction in turbidity

The results show that the flocculant of the present invention is effective at lower dosage levels than are the comparative flocculants.

EXAMPLE 5

The polymers of each of Examples 1, 2, and 3 were evaluated as in Example 4 except that only the suspension of bentonite was employed. Results are shown in Table II.

Table II

| Polymer of Example | Bentonite Flocculation | |
|---|---|---|
| | Molecular Weight | Dosage For 20% Residual Turbidity (ppm) |
| 1 | 260,000 | 1.00 |
| 2 | 52,000 | 1.03 |
| 3 | 5,300 | 1.35 |

These results show that there is little effect on flocculation as the molecular weight is increased above about 5,000.

EXAMPLE 6

Iron ore tailings from the Eveleth mining operations were subjected to flocculation using various dosages of a series of flocculants. From the results it was possible to determine dosage requirements to effect maximum clarification. Results and identification of the flocculants employed are given in Table III.

Table IV

| Flocculant | Flocculation of Eveleth Iron Ore Tailings | |
|---|---|---|
| | Dosage (ppm) | Residual Turbidity (J.T.U.) |
| Example 1 | 4 | 14 |
| Comp. Floc. B | 6 | 26 |
| Comp. Floc. C | 6 | 20 |

These results show that the flocculant of the present invention provides greater clarification at lower dosage.

We claim:

1. A process for preparing a polyquaternary flocculant which process comprises: (1) preparing a preliminary free-radical polymer of a monomer selected from (i) the group consisting of N,N-dimethylacrylamide, N,N-dimethylmethacrylamide, N-methyl, N-ethylacrylamide, N-methyl, N-ethylmethacrylamide, N, N-diethylacrylamide, N,N-diethylmethacrylamide, N-methyl, N-isopropylacrylamide, N-methyl, N-isopropylmethacrylamide, N-methyl, N-n-propylacrylamide, and N-methyl, N-n-propylmethacrylamide and (ii) mixtures thereof of a dialkylacrylamide of the structure:

wherein R is hydrogen or methyl, R' and R" are alkyl groups such that the number of carbons provided by R' and R" is from 2 to about 4, said polymer having a molecular weight of at least about 5,000; (2) reducing the amide groups of the preliminary polymer to complete absence of carbonyl absorption in the infrared so as to provide the corresponding intermediate allyldialkylamine polymer; and (3) quaternizing the intermediate polymer using a stoichiometric excess of quaternization agent to ensure complete quaternization to provide the corresponding final poly(allyltrialkylammonium) flocculant in the form of a water-soluble salt, said polymer containing a total of 3 to about 5 carbons in said trialkyl groups.

2. The process of claim 1 wherein said R is hydrogen.

3. The process of claim 1 wherein R' and R" are methyl.

4. The process of claim 2 wherein R' and R" are methyl.

5. The process of claim 1 wherein said polyquaternary flocculant has a molecular weight of at least about 50,000.

6. The process of claim 1 wherein said polyquaternary flocculant has a molecular weight of at least about 250,000.

7. The process of claim 4 wherein said polyquaternary flocculant has a molecular weight of at least about 50,000.

8. The process of claim 4 wherein said polyquaternary flocculant has a molecular weight of at least about 250,000.

9. The process of claim 1 wherein said quaternizing step is carried out with dimethyl sulfate.

10. The process of claim 4 wherein said quaternizing step is carried out with dimethyl sulfate.